United States Patent [19]

Balsells

[11] Patent Number: 4,805,943
[45] Date of Patent: Feb. 21, 1989

[54] ROTARY/RECIPROCATING SEAL APPARATUS

[75] Inventor: Peter J. Balsells, 17592 Sherbrook Dr., Tustin, Calif. 92680

[73] Assignees: Peter J. Balsells; Joan C. Balsells, both of Santa Ana, Calif.

[21] Appl. No.: 64,858

[22] Filed: Jun. 19, 1987

Related U.S. Application Data

[63] Continuation-in-part of Ser. No. 896,722, Aug. 15, 1986, Pat. No. 4,678,210.

[51] Int. Cl.⁴ .............................................. F16F 1/12
[52] U.S. Cl. .................................. 285/318; 285/305; 285/321; 267/167; 403/326
[58] Field of Search ............... 285/305, 306, 318, 321; 277/205, 206 R, 157, 163, 164, 158; 267/167, 164; 403/326, DIG. 7

[56] References Cited

U.S. PATENT DOCUMENTS

| | | | |
|---|---|---|---|
| 2,101,346 | 12/1937 | Robertson | 267/167 X |
| 2,154,275 | 4/1939 | Linn | 267/167 X |
| 2,538,683 | 1/1951 | Guiler et al. | 285/321 X |
| 2,797,937 | 7/1957 | Frishof | 285/306 X |
| 2,846,240 | 8/1958 | Beyer | 285/318 X |
| 2,957,717 | 10/1960 | Bram | 277/164 |
| 3,223,426 | 12/1965 | Reid | 277/205 X |
| 3,250,331 | 5/1966 | Boyle | 267/167 X |
| 3,359,617 | 12/1967 | Baumler | 267/167 X |
| 3,377,075 | 4/1968 | Feller | |
| 3,468,527 | 9/1969 | Mather | 267/167 |
| 3,910,566 | 10/1975 | Pedersen et al. | 267/167 |
| 4,655,462 | 4/1987 | Balsells | 267/167 X |

FOREIGN PATENT DOCUMENTS 674720  6/1952  United Kingdom ............... 267/167

Primary Examiner—Randolph A. Reese
Assistant Examiner—Anthony Knight
Attorney, Agent, or Firm—Walter A. Hackler

[57] ABSTRACT

The rotary/reciprocating seal apparatus includes a resilient ring member with a circumferential groove therein having a surface of revolution disposed at an angle with the axis of the ring member. The resilient ring member includes an axial opening thereinside for accepting and enabling the shaft to be rotated and/or reciprocated therein. The cylindrical housing is provided which includes an axial opening thereinside to accommodate the ring member and includes a groove on an inside surface of the cylindrical housing with a second surface of revolution disposed at an angle with an axis of the cylindrical housing. Spring means are provided in both the ring member and the cylindrical housing grooves for forcing the first and second surfaces of revolution away from one another in order to cause axial loading between the ring member and the cylindrical housing. Biasing means are provided and disposed in the ring member for urging portions of the ring member against the shaft and the cylindrical housing inside surface, respectively, in order to create a seal therebetween.

15 Claims, 3 Drawing Sheets

ROTARY/RECIPROCATING SEAL APPARATUS

This application is a continuation-in-part of U.S. patent application Ser. No. 896,722, filed Aug. 15, 1986, now U.S. Pat. No. 4,878,210 issued July 7, 1987.

The present invention generally relates to locking mechanisms for cylindrical members and is more particularly directed to seals suitable for rotary and/or reciprocating surfaces which are locked to a support housing.

Generally seals for rotary shafts are supported by a housing. In order to prevent the seal from separating from the housing during use, back-up plates are provided to retain the seal, or the seal is clamped to the housing.

It should be apparent that clamping of the seal, which must have appropriate resiliency to perform a sealing function, can introduce nonuniformity in the performance of the seal between the shaft and the seal. That is, portions of the seal near the clamp, or back-up plate, may not exhibit the same resiliency as other portions of the seal. In these instances, the seal will not provide uniform biasing between the housing and the shaft, which is desirable for proper sealing. Heretofore, to overcome non-uniformities in the seal, increased loading of the seal was used to ensure that all portions of the seal have sufficient pressure against the shaft to prevent leakage therepast. Consequently, due to the excess pressure necessary, increased friction and wear occurs which may substantially reduce the seal life.

It is also important that a seal design for rotary service does not rotate with the rotating member, or shaft, as this may lead to unwanted friction, wear and leakage past the housing supporting the seal.

The present invention provides for a seal suitable for rotary and reciprocating service which does not require a back-up plate or a clamping mechanism to hold the seal to a housing. This enables a simpler design and an economy of support means for the seal. The present invention is useful in a wide range of applications, including the sealing and engaging of lightweight, delicate and many times fragile parts, such as those used in the laboratory, as well as more industrial applications in which the seal is operative to pressures of up to 500 psi and shaft speeds of 5000 RPM.

SUMMARY OF THE INVENTION

Rotary/reciprocating seal apparatus in accordance with the present invention generally includes a resilient ring member including means defining a circumferential groove therein. The circumferential groove includes a first surface of revolution disposed at an angle with the axis of the ring member and the resilient ring member includes means defining axial opening therein sized for accepting and enabling a shaft to be rotated and/or reciprocated therein.

A cylindrical housing is provided which includes means defining an axial opening sized to accommodate the resilient ring member. The cylindrical housing also includes means defining a groove in an inside surface of the cylindrical housing, with the inside surface groove including a second surface of evolution disposed at an angle with the axis of the cylindrical housing.

Spring means are provided and disposed in both the ring member and cylindrical housing grooves for forcing the first and second surfaces of revolution away from one another to cause an axial loading between the ring member and the cylindrical housing. This axial loading between the resilient ring member and the cylindrical housing enables the seal apparatus to remain in position, despite a differential in pressure thereacross of gas or fluid for which the seal is providing a barrier.

Importantly, no back-up plate is required to axially stabilize the seal apparatus with respect to the housing and the rotating shaft.

The spring means, independent of biasing means, which is provided and disposed in the resilient ring member for urging portions of the ring member against the shaft and the cylindrical housing inside surface, respectively, in order to create a seal therebetween. Hence, the spring member, in locking the seal to the housing, is independent of the biasing means which provide the force effecting the seal between the shaft and the housing. Since the locking action and the sealing action of the seal are independent, greater design variations are possible with regard to pressure sustainable by the seal without the "blowing out" thereof and the force necessary to seal the shaft without excessive pressure thereon which may cause increased friction, wear and result in shortened seal life.

Preferably the first and second services of revolution are approximately parallel with one another and the circumferential groove further includes a third surface of revolution disposed at an angle with the axis of the cylindrical housing and facing a second surface of revolution. The inside surface groove is sized for enabling the ring member and the cylindrical housing to be separated from one another by relative movement thereof, causing either the first or the third surface of revolution to compress the spring means into the inside groove, allowing the cylindrical housing to move therepast.

In applications in which bidirectional rotary services required, the resilient ring member includes means defining a first and a second circumferential groove and the cylindrical housing includes means defining a first and a second groove on an inside surface thereof. Each of the resilient ring member grooves include a first surface of revolution disposed at an angle with the axis of the ring member and each of the cylindrical housing grooves include a second surface of revolution disposed at an angle with the axis of the cylindrical housing. In this embodiment the spring means includes a first and a second ellipsoidal spring disposed in both the ring member and cylindrical housing first and second grooves, respectively, for preventing rotation of the ring member as the shaft is rotated.

BRIEF DESCRIPTION OF THE DRAWINGS

A better understanding of the present invention may be had from the consideration of the following detailed description, taken in conjunction with the accompanying drawings, in which.

DETAILED DESCRIPTION

Figure 1:
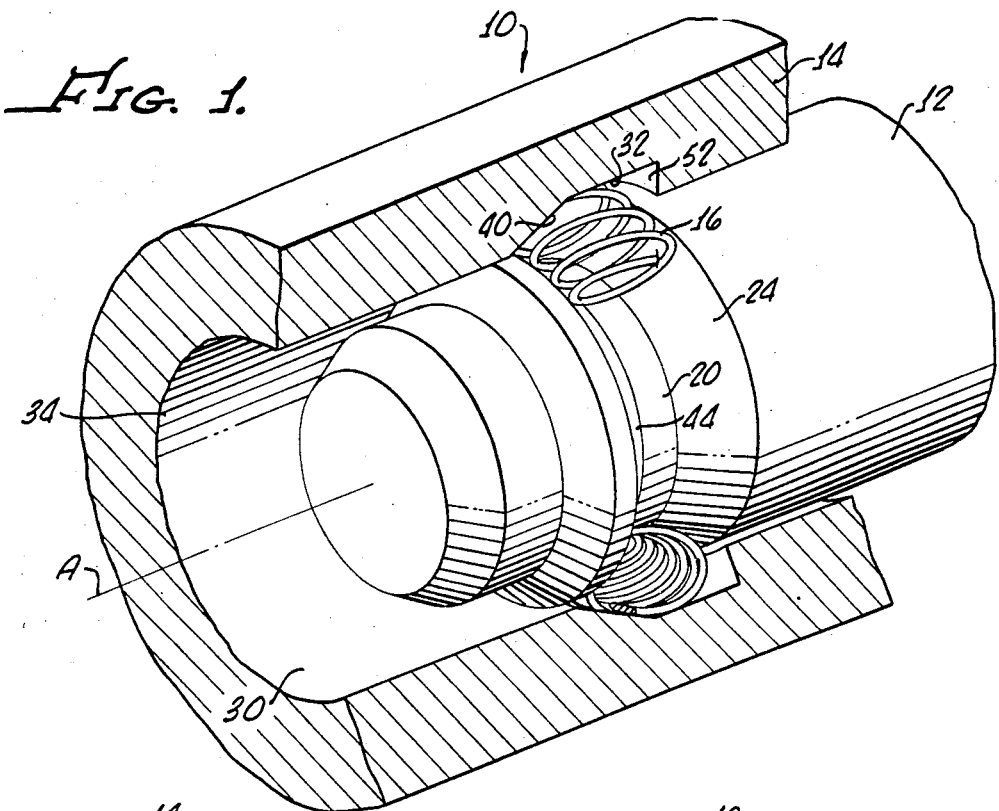
FIG. 1 is a perspective view of loading and locking mechanism of the present invention partially broken away showing a first and a second cylindrical member engaged with one another, with axial loading therebetween provided by a ellipsoidal spring disposed in a groove formed in each of the first and second cylindrical members.
Figure 2:
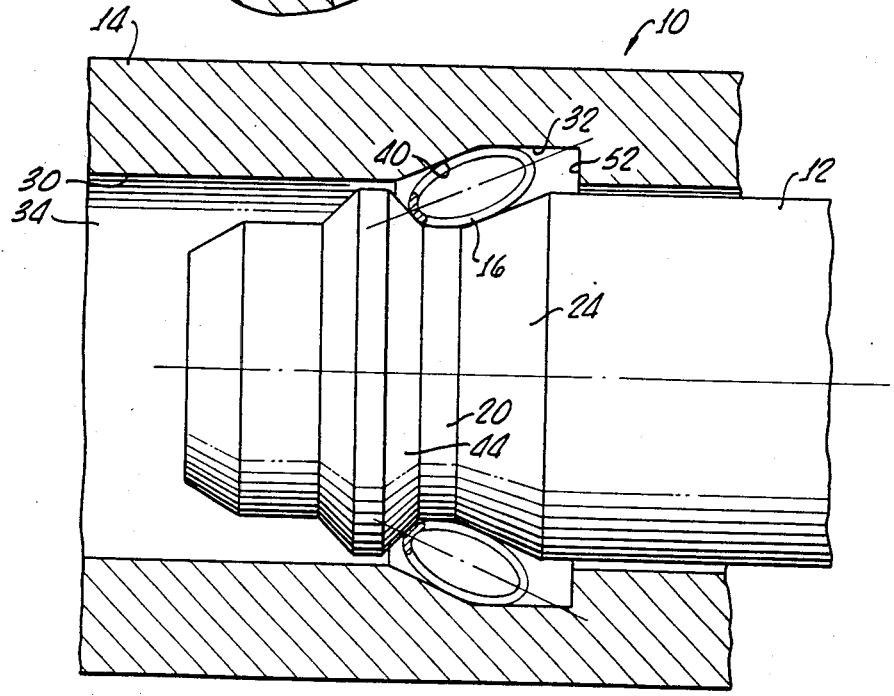
FIG. 2 is a cross-sectional view of the locking and loading mechanism of the present invention showing the first and second cylindrical member in an operational position.

Turning now to FIGS. 1 and 2 there is shown a loading and locking mechanism 10 of the present invention including a first cylindrical member 12, a second cylindrical member 14 and an ellipsoidal spring 16. The cylindrical member 12 may be resilient and have an axial hole therethrough for accommodating a shaft as hereinabove discussed. It should be appreciated that the drawings herein presented are not to scale, and that the diameters of the first and second cylindrical members 12, 14, as well as the wall thickness of the second cylindrical member, may be fractions of an inch. The material of construction for the mechanism may be of lightweight material suitable for a laboratory environment, such as glass, teflon, and the like.

The first cylindrical member 12 includes a circumferential groove 20 which includes a first surface of revolution, or loading surface, 24, which is disposed at an angle with the axis A of the first and the second cylindrical members 12, 14. An axial opening 30 in the second cylindrical member 14 is sized to accommodate the first cylindrical member 12 and includes a groove 32 on an inside surface 34, with the inside surface groove 32 including a second surface of revolution 40 disposed at an angle with the axis A.

Axial loading, or biasing, of the first and second cylindrical members 12, 14 is produced by the spring 16 forcing the first and second surfaces of revolution 24, 40 in directions away from each other. In this manner, the first and second cylindrical members can be aligned within equipment (now shown) and otherwise provide a force for sealing the members to one another, or other members (not shown), through the use of conventional sealing arrangements (not shown).

The ellipsoidal spring 16 may be constructed in accordance with specifications set forth in U.S. Pat. No. 4,655,462, issued Apr. 7, 1987, which is incorporated herewith by specific reference thereto. In order to provide a constant loading between the cylindrical members, the spring 16 may include a plurality of coils 18 disposed in a canted relationship with an axis B of the spring as described in the aforementioned patent application and shown in FIG. 3.

As shown in FIG. 1, a third surface of revolution 44 may be provided in the first cylindrical member 12 which is disposed with an angle with the axis A and facing the surface of revolution 24. In this arrangement, the members 12, 14 may be separated from one another by axial movement, overcoming the force of the spring 16, with either the first or third surface of revolution compressing the spring 16 into the inside groove 32.

Where more positive locking is desired in one direction, the first cylindrical member 12a in accordance with a second embodiment of the present invention may include a shoulder 46, (FIG. 4) having a first locking surface 48 disposed in a plane approximately perpendicular to the axis of the member 12a and the second cylindrical member may include a second locking surface 52 disposed approximately perpendicular to the axis A.

Preferably, the first and second surfaces of revolution 24, 40 are disposed approximately parallel with one another, and where radial indexing of the first and second cylindrical members 12a, 14 is not necessary, the members 12a and 14 may be cylindrical in cross-section, as shown in the Figures.

Figure 4:
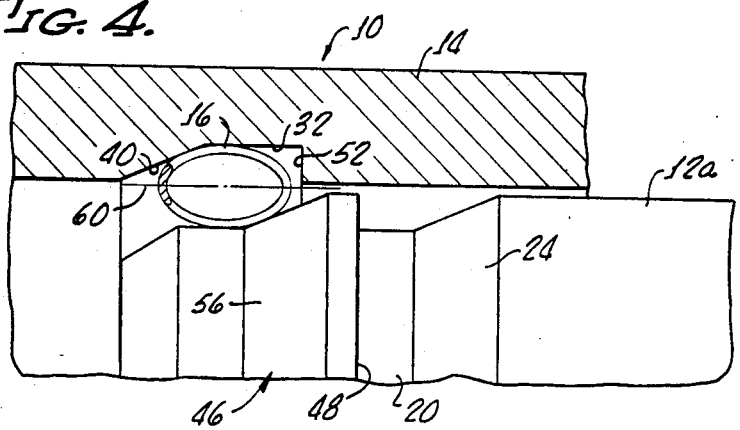
FIG. 4 is an alternative embodiment of the locking and loading mechanism of the present invention for enhanced locking.
Figure 5:
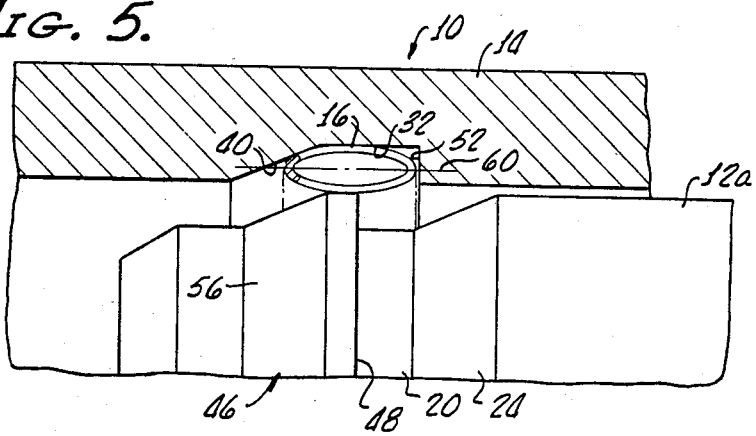
FIG. 5 is a cross-sectional view of the locking and loading mechanism of the present invention in an intermediate position in which a ramp forces the ellipsoidal spring into a second groove disposed in a second cylindrical member.
Figure 6:
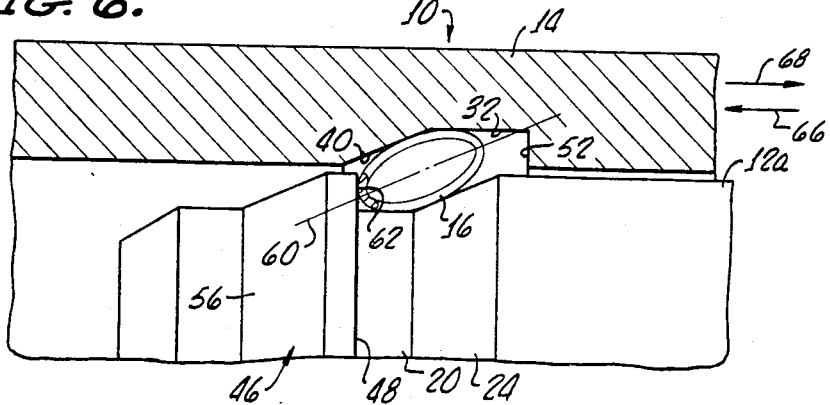
FIG. 6 is a cross-sectional view of the locking and loading mechanism of the present invention showing in greater detail the torroidal spring disposed in the circumferential groove and the inside surface groove in engaging with a first and second loading surface to cause axial loading between the first and second cylindrical members.

To facilitate assembly of the mechanism, the shoulder 46 may include a ramp 56 for compressing the ellipsoidal spring 16 into the groove 32, as shown in FIGS. 4, 5 and 6 in step-wise fashion.

When assembled in a cooperating position for locking and loading, as shown in FIG. 6, the elliptically-shaped coil 16 is disposed in part in both of the grooves 20, 32, with a major axis 60 approximately parallel to the first and second surfaces of revolution 24, 40.

Importantly, to enhance the locking characteristics of the present invention, the first locking surface 48 engages elliptically-shaped coil spring at a point 62, which is between the elliptically-shaped coil major axis 60 and the second surface of revolution 40. (See FIG. 6).

As can be seen in FIG. 6, if the first cylindrical member 12 is held stationary and the second cylindrical member is moved in a direction indicated by the arrow 66, the first and second locking surfaces 48, 52 will close and compress the ellipsoidal spring 12 in an axial direction which increases the radial force of the ellipsoidal spring providing greater engagement force with the first and second cylindrical members to thereby enhance the locking characteristic of the mechanism. As hereinbefore pointed out, the point 62 of engagement of the first locking surface 48 with the spring 12 is above the axis 60 of the spring, thereby preventing the spring from moving over the first locking surface.

On the other hand, uncoupling of the members is accomplished by holding the first cylindrical member 12 in a stationary position and moving the second cylindrical member in a direction of the arrow 68, thus causing the loading surfaces 24, 40 to compress the spring into the groove 20 and allow the cylindrical members 12a, 14 to pass one another for separation.

It should be appreciated that the height of the second locking surface, or depth of the second groove 32, is greater than the radial height of the ellipsoidal coil spring 16, when the spring is compressed to its elastic limit to enable separation of the first and second cylindrical members 12a, 14 from one another as the first surface of revolution radially compresses the spring into the inside surface groove 32.

Figure 7:
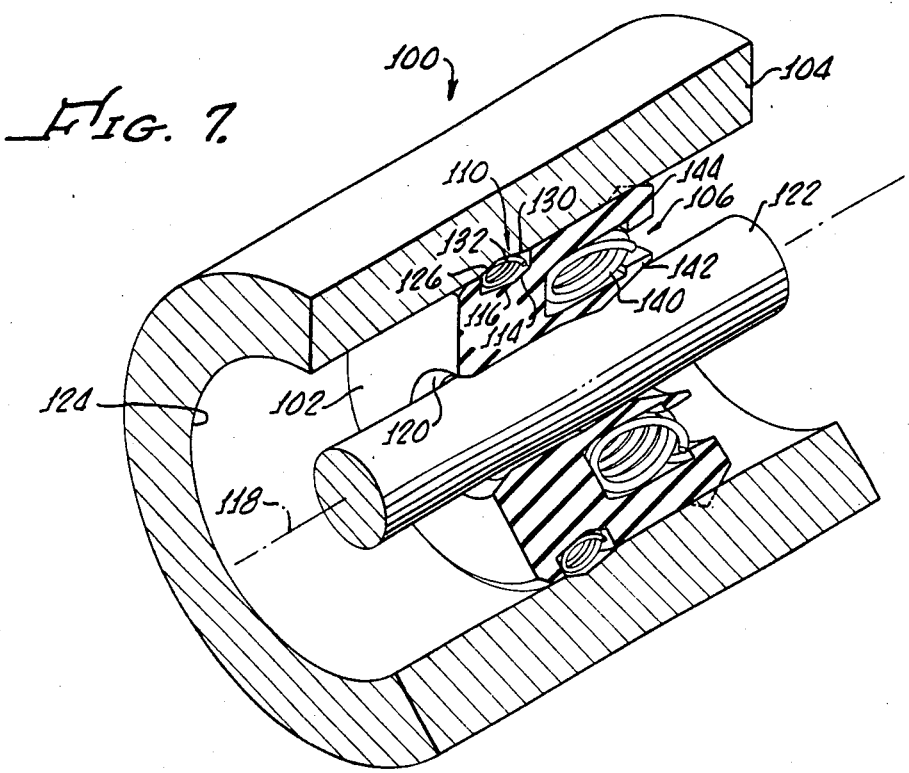
FIG. 7 is a perspective view of the present invention generally showing a resilient ring member, a cylindrical housing, spring means for providing and loading and locking and biasing means for urging portions of the ring member against a shaft and the cylindrical housing.

Turning now to FIG. 7, there is shown rotary/reciprocating seal apparatus 100 in accordance with the present invention which includes a resilient ring member 102, cylindrical housing 104 and biasing means 106.

It should be appreciated that the locking and loading portion 110 of this embodiment is identical to the mechanism 10 hereinbefore described in greater detail. The resilient ring member 102 includes a circumferential groove 114 which includes a first surface of revolution 16 disposed at an angle with an axis 118 of the ring member. An axial opening 120 is provided for accepting and enabling a shaft 122 to be rotated and/or reciprocated therein.

The cylindrical housing 104 includes an axial opening 122, sized to accommodate the ring member 102, and includes a groove 126 in an inside surface thereof, having a second surface of revolution 130 disposed at an angle with the axis 118. A spring 132 disposed in both the ring member and cylindrical housing grooves 114, 126, provides means for forcing the first and second surfaces of revolution 116, 130 away from one another to cause an axial locking and loading between the ring member 102 and the cylindrical housing 104 as hereinbefore described in connection with FIGS. 1-6.

Radial sealing between the shaft 122 and the housing 104 is effected through a spring 140 which provides biasing means for urging lip portions 142, 144 of the ring member against the shaft 122 and housing 104, respectively.

The resilient member may be formed from Teflon for light duty service, or may consist of graphite-fiber Teflon, for general duty and water-service, high temperature and high-speed applications. The spring 140 may be comprised of any suitable material, such as stainless steel.

Figure 3:
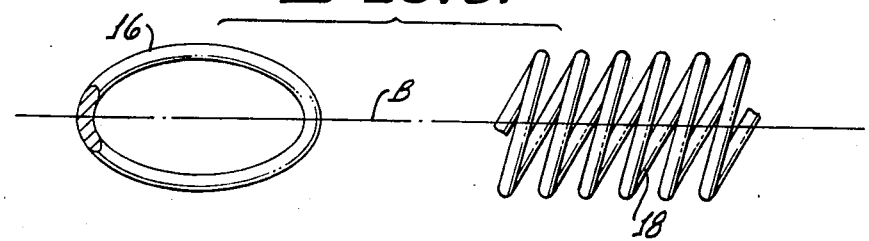
FIG. 3 is a view of a torroidal spring showing individual coils slanted, or canted, with an axis of the spring.

It should be appreciated that the spring 130 may be ellipsoidal and canted, as shown in FIG. 3, or of other suitable design.

Figure 8:
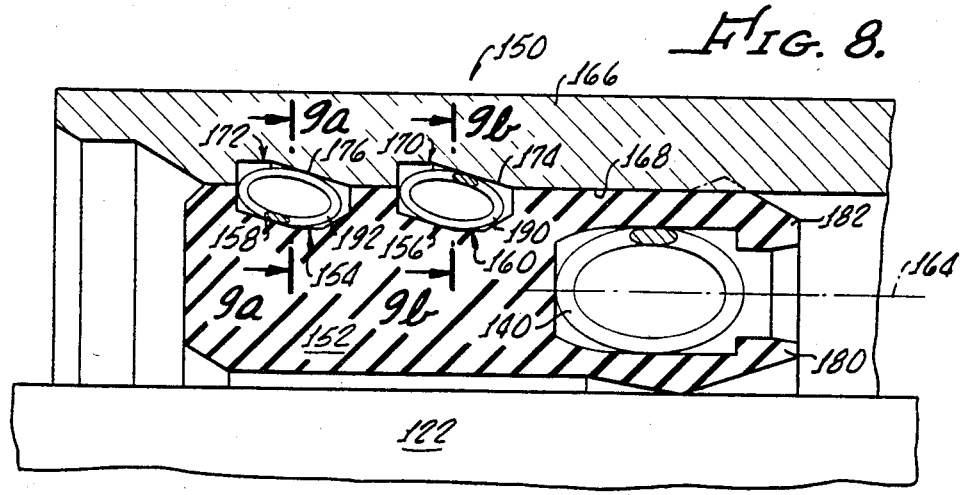
FIG. 8 is a cross-sectional view of the rotary/reciprocating seal apparatus shown in FIG. 7 but with two ellipsoidal springs for preventing rotation of the resilient member with the shaft.

Turning to FIG. 8, there is shown an alternative embodiment of 150 of the present invention which includes a resilient ring member 152, having a first and a second groove 154, 156 therein, each including a first surface of revolution 158, 160, disposed at an angle with the axis 164. A cylindrical housing 166 includes an axial opening 168 sized to accommodate the ring member 152 and includes a first and a second groove 170, 172 formed on an inside surface of the housing 166 with each inside surface groove including a second surface of revolution 174, 176 disposed at an angle with the axis 164.

A spring 140, disposed in the ring member 152, is provided for urging lip portions 180, 182 of the resilient ring 152 against the shaft 122 and housing 166, respectively, in order to create a seal therebetween as hereinbefore described in connection with FIG. 7. Two ellipsoidal springs 190, 192 are disposed in both the ring member and cylindrical housing first and second grooves 154, 156, 174, 176, provide means for locking and axially loading the resilient member 152 and housing 166 with one another as hereinbefore described in connection with FIGS. 1-7.

Figure 9A:
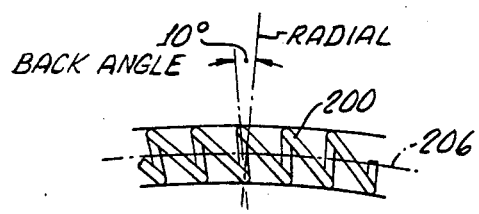
FIGS. 9a and 9b are diagrammatic cross-sectional views of the ellipsoidal springs showing the relative relationship between the canted coils therein.
Figure 9B:
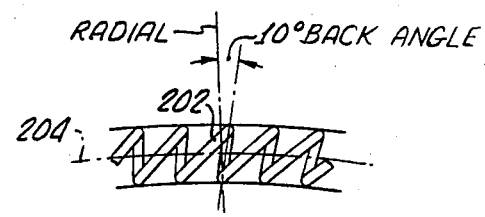

In order to prevent a rotation of the ring member 152 with the shaft 122 as it may be rotated in opposite directions. The springs 190, 192 are preferably formed with a plurality of coils 200, 202 which are canted in opposite directions with with axis 204, 206, respectively, as shown in FIG. 9a and 9b, which are views taken along the lines 9a and 9b of FIG. 8.

The canting of the coils allows one of the springs to tighten between the resilient member of 152 and housing 104 as the shaft is rotated in one direction and the other to tighten as the shaft is rotated in the other direction.

Although there has been described hereinabove a specific rotary/reciprocating seal apparatus in accordance with the present invention for the purpose of illustrating the manner in which the invention may be used to advantage, it should be appreciated that the invention is not limited thereto. According, any and all modifications, variations or equivalent arrangements, which may occur to those skilled in the art, should be considered to be within the scope of the invention as defined in the appended claims.

What is claimed is:

1. Rotary/reciprocating seal apparatus comprising:
   a resilient ring member including means defining a circumferential groove therein, said circumferential groove including a first surface of revolution disposed at an angle with the axis of said ring member, said resilient member including means defining an axial opening therein sized for accepting and enabling a shaft to be rotated and/or reciprocated therein;
   a cylindrical housing including means defining an axial opening sized to accommodate said ring member, said cylindrical housing including means defining a groove in an inside surface of said cylindrical housing, the inside surface groove including a second surface of revolution disposed at an angle with the axis of said cylindrical housing;
   spring means disposed in both the ring member and cylindrical housing grooves for forcing said first and second surfaces of revolution away from one another to cause an axial loading between the ring member and the cylindrical housing; and,
   biasing means, disposed in the ring member in a spaced apart relationship with said spring means, for urging portions of the ring member against the shaft and the cylindrical housing inside surface, respectively, in order to create a seal therebetween.

2. The rotary/reciprocating seal apparatus according to claim 1 wherein the first and second surfaces of revolution are approximately parallel with one another.

3. The rotary/reciprocating seal apparatus according to claim 1 wherein said circumferential groove further comprises a third surface of revolution disposed at an angle with the axis of the cylindrical housing and facing said second surface of revolution, the inside surface groove being sized for enabling the ring member and the cylindrical housing to be separated from one another by relative movement thereof causing either said first or third surface of revolution to compress the spring means into the inside surface groove allowing the cylindrical housing to move therepast.

4. Rotary/reciprocating seal apparatus comprising:
   a resilient ring member including means defining a first and a second circumferential groove therein, said circumferential grooves, each including a first surface of revolution disposed at an angle with the axis of said ring member, said resilient ring member including means defining an axial opening therein sized for accepting and enabling a shaft to be rotated and/or reciprocated therein;

a cylindrical housing including means defining an axial opening sized to accommodate said ring member, said cylindrical housing including means defining a first and a second groove in an inside surface of said cylindrical housing, each inside surface groove including a second surface of revolution disposed at an angle with the axis of said cylindrical housing;

spring means comprising a first and a second ellipsoidal spring disposed in both the ring member and cylindrical housing, first and second grooves, respectively, for preventing rotating of the ring member as the shaft is rotated; and biasing means, disposed in the ring member, for urging portions of the ring member against the shaft and the cylindrical housing inside surface, respectively, in order to create a seal therebetween.

5. The rotary/reciprocating seal apparatus according to claim 4 wherein the first and second ellipsoidal springs comprises first and second coils, respectively, disposed in a canted relationship with an axis of the ring member, the first coils being canted in one direction and the second coil being canted in an opposite direction.

6. Rotary/reciprocating seal apparatus comprising:

a ring member including means defining a circumferential groove therein, said circumferential groove including a first surface of revolution disposed at an angle with the axis of said ring member, said resilient ring member including means defining an axial opening therein sized for accepting and enabling a shaft to be rotated and/or reciprocated therein;

a cylindrical housing including means for defining an axial opening sized to accommodate said ring member, said cylindrical housing including means defining a groove in an inside surface of said cylindrical housing, the inside surface groove including a second surface of revolution disposed at an angle with the axis of said cylindrical housing;

spring means disposed in both the ring member and the cylindrical housing grooves for forcing said first and second surfaces of revolution away from one another to cause an axial loading between the ring member and cylindrical housing biasing means, disposed in the ring member, for urging portions of the ring member against the shaft and the cylindrical housing member inside surface, respectively, in order to create a seal therebetween; and locking means for preventing separation of the ring member and the cylindrical housing by movement of the first and second surfaces of revolution away from one another, said locking means comprising a first locking surface in said circumferential groove disposed in a plane approximately perpendicular to the axis of the cylindrical housing and a second locking surface in the inside surface groove disposed in a plane approximately perpendicular to the axis of the cylindrical housing.

7. The rotary/reciprocating seal apparatus according to claim 6 wherein the inside surface groove is sized for enabling the ring member cylindrical housing to be separated from one another by movement of the first and second surfaces of revolution toward one another causing said first surface of revolution to compress the first spring means into the inside surface groove allowing the ring member to move therepast.

8. Rotary/reciprocating seal apparatus comprising:

a resilient ring member including means defining a circumferential groove having a shoulder and a first loading surface, said shoulder comprising a first locking surface disposed in a plane approximately perpendicular to the axis of the first cylindrical member, said first loading surface comprising a first surface of revolution disposed at an angle to the first cylindrical member axis, said resilient ring member including means defining an axial opening therein sized for accepting and enabling a shaft to be rotated and/or reciprocated therein;

a cylindrical housing including means defining an axial opening therein sized to accommodate said ring member, said cylindrical housing including means defining a groove in an inside surface of said cylindrical housing, the inside surface groove having a second loading surface disposed in a plane approximately perpendicular to the axis of the cylindrical housing, and a second locking surface comprising a second surface of revolution disposed at an angle to the cylindrical housing axis; and, spring means disposed in both the circumferential groove and the inside surface groove for forcing said first and second loading surface away from one another to cause an axial loading between ring member and the cylindrical housing, said first and second locking surfaces preventing the axially loaded first and second cylindrical members from separating from one another by engaging said spring means; and biasing means, disposed in the ring member, for urging portions of the ring member against the shaft and the cylindrical housing inside surface in order to create a seal therebetween.

9. The rotary/reciprocating seal apparatus according to claim 8 wherein the first and second surface of revolution are approximately parallel with one another.

10. The rotary/reciprocating seal apparatus according to claim 8 wherein said spring means comprises a continuous ellipsoidal coil spring.

11. The rotary/reciprocating seal apparatus according to claim 8 wherein said spring means comprises two continuous ellipsoidal coil springs, each having elliptically shaped coils.

12. The rotary/reciprocating seal apparatus according to claim 11 wherein said elliptically shaped coils are disposed in a canted relationship with an axis of the ring member, one of the elliptically shaped coils being canted in one direction and the other elliptically shaped coil being canted in an opposite direction.

13. The rotary/reciprocating seal apparatus according to claim 11 wherein the ellipsoidal shaped coil spring is disposed in the circumferential groove and the inside surface groove with major axis of the elliptically shaped coils approximately parallel to the first and second surfaces of revolution.

14. The rotary/reciprocating seal apparatus according to claim 12 wherein said first locking surface engages said elliptically shaped coil spring at a point thereon between the elliptically shaped coils' major axis and the second surface of revolution.

15. The rotary/reciprocating seal apparatus according to claim 14 wherein said shoulder further comprises ramp means for enabling assembly of the mechanism, said ramp means compressing said ellipsoidal spring as the ring member is pushed into the cylindrical housing axial opening.

* * * * *